United States Patent [19]

Laskaris

[11] 4,363,981
[45] Dec. 14, 1982

[54] MEANS TO REDUCE FRICTIONAL HEATING OF A SUPERCONDUCTING WINDING AT AN INTERFACE WITH ITS SUPPORT STRUCTURE

[75] Inventor: Evangelos T. Laskaris, Schenectady, N.Y.

[73] Assignee: General Electric Company, Schenectady, N.Y.

[21] Appl. No.: 259,388

[22] Filed: May 1, 1981

[51] Int. Cl.³ .............................................. H02K 9/00
[52] U.S. Cl. ...................................... 310/52; 310/45; 174/15 S; 174/128 S; 336/60
[58] Field of Search ................... 310/10, 40 R, 52, 51, 310/59, 43, 45, 58, 64, 65, 91, 60, 61, 215; 174/15 S, 126 S, 128 S; 336/60, 61, DIG. 1

[56] References Cited

U.S. PATENT DOCUMENTS

| | | | |
|---|---|---|---|
| 2,664,512 | 12/1953 | Huntley | 310/64 |
| 3,991,333 | 11/1976 | Laskaris | 310/52 |
| 4,001,616 | 1/1977 | Lonseth et al. | 310/45 |
| 4,013,908 | 3/1977 | Weghaupt | 310/52 |
| 4,060,743 | 11/1977 | Weghaupt | 310/52 |
| 4,277,705 | 7/1981 | Rios | 310/64 |
| 4,282,450 | 8/1981 | Eckels | 310/45 |

OTHER PUBLICATIONS

K. A. Tepper, "Mechanical and Heat Transfer Models for Frictional Heating in Superconducting Coils," IEEE Traansactions on Magnetics, vol. MAG-17, No. 1, Jan. 1981, pp. 1060-1063.

Primary Examiner—R. Skudy
Attorney, Agent, or Firm—Charles E. Bruzga; James C. Davis, Jr.; Marvin Snyder

[57] ABSTRACT

Improved structure for reducing heating a monolithic suuperconducting winding due to friction generated at an interface between a "low eddy current" support structure and the winding is disclosed. Such improved structure comprises a low shear modulus, compliant material and high thermal conductivity sheet metal disposed in the interface region between the super-conducting winding on the support structure. The low shear modulus, compliant material yields in the shear direction, thereby reducing frictional heating, and whatever frictional heat is generated is removed by the high conductivity sheet metal and transferred to helium cooling channels which are located in the low eddy current support structure.

17 Claims, 1 Drawing Figure

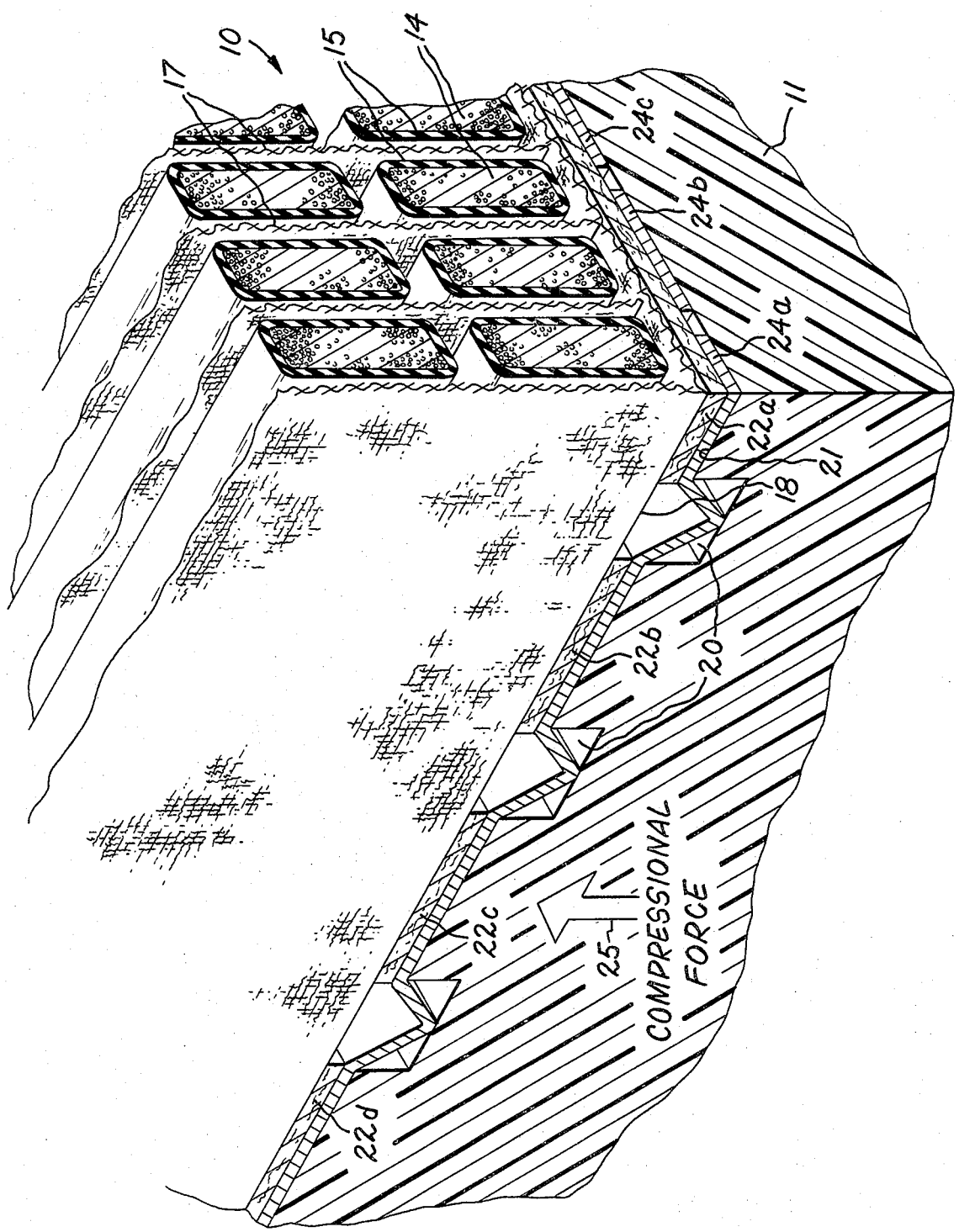

MEANS TO REDUCE FRICTIONAL HEATING OF A SUPERCONDUCTING WINDING AT AN INTERFACE WITH ITS SUPPORT STRUCTURE

CROSS-REFERENCE TO RELATED APPLICATION

The present application is related to U.S. patent application, Ser. No. 217,329, filed on Dec. 17, 1980, by E. T. Laskaris (the inventor of the present invention), which is assigned to the same assignee as is the present application.

BACKGROUND OF THE INVENTION

The present invention relates to improved means for reducing the heating of a monolithic superconducting winding due to friction generated at an interface between the superconducting winding and a support structure for the winding, and more particularly to such improved means wherein the support structure comprises a low thermal diffusivity material.

As used herein, a "monolithic" superconducting winding comprises a superconducting winding structure which is substantially rigid throughout, but which is not necessarily completely solid whereby a monolithic superconducting winding can comprise cooling channels, for example. Due to the relatively rigid nature of a monolithic superconducting winding, relative vibration of a portion of the superconducting winding and the attendant heat generation therefrom is avoided. The avoidance of heat generation in, or heat transfer to, a superconducting winding is of utmost cruciality due to the superconducting nature of the winding. That is to say, a precondition of superconductivity of a superconducting winding is that windings remain at or below a very low temperature, such as 4° Kelvin. Accordingly, a superconducting winding has very little capacity for absorbing heat.

Where the support structure for a superconducting winding is subjected to a rapidly varying magnetic field, eddy currents and heating therefrom can be generated in the support structure for the superconducting winding. In order to limit eddy current heating of support structure for such a superconducting winding, the support structure material must comprise a material with a high electrical resistivity whereby eddy current heating therein is limited to a tolerable level: that is to say, a level in accordance with the capacity for the superconducting winding to absorb heat without losing the property of superconductivity. It is typical for support structure with such high electrical resistivity to also have the property of low thermal diffusivity, or, in other words, the inability to absorb significant amounts of heat.

Relative sliding between an external surface of a monolithic superconducting winding and a support structure having low thermal diffusivity presents an acute problem. The frictional heat generated from the relative sliding motion is not able to be effectively absorbed by the support structure. As a consequence to this fact, frictional heat caused by the relative sliding motion is known to have been transferred to a superconducting winding with a resultant loss of superconductivity thereof.

One prior art means for minimizing the foregoing friction heating problem has been to hold the support structure for a superconducting winding under high compression, such as 5,000 psi, against the winding. However, relative sliding motion between the support structure and the superconducting winding, probably localized in nature, is known to have resulted in heating of the superconducting winding to a point where it loses the property of superconductivity.

OBJECTS OF THE INVENTION

Accordingly, it is an object of the present invention to provide improved means to reduce heating of a monolithic superconducting winding due to friction generated at an interface between the winding and a support structure therefor.

It is a further object of this invention to provide improved means to harmlessly dissipate any frictional heat due to relative sliding motion between a monolithic superconducting winding and a support structure therefore.

Further objects and advantages of the present invention will become apparent from a reading of the remainder of this specification in conjunction with the drawing figures.

SUMMARY OF THE INVENTION

In carrying out the foregoing objects of the invention, there is provided an improved means to reduce heating of a monolithic superconducting winding due to friction generated at an interface between the superconducting winding and a support structure for the winding. The support structure comprises a material having a high electrical resistivity whereby eddy current heating therein is limited to a tolerable level. The suppport structure has a first surface held under a compressional force against the superconducting winding and has a plurality of spaced apart helium cooling channels in the first surface thereof. The improved means comprises compliant sheet material and high thermal conductivity sheet metal. The compliant sheet material has a low shear modulus and has first and second sides, with the first side being bonded to an external surface of the superconducting winding. The high thermal conductivity sheet metal has first and second sides with the first side disposed in contact with the second side of the low shear modulus sheet material and the second side thereof disposed in contact with the first surface of the support structure. The high thermal conductivity sheet metal has portions thereof respectively disposed within the plurality of helium cooling channels. The compliant sheet material serves to reduce frictional heating inasmuch as the first and second sides thereof are able to move relative to one another in the shear direction. Whatever frictional heat is generated, however, is transferred to helium within the helium cooling channels by the high thermal conductivity sheet metal.

BRIEF DESCRIPTION OF THE DRAWING FIGURE

The sole drawing FIGURE is a cross-sectional view in perspective of a portion of a monolithic superconducting winding and support structure therefor, illustrating details of the present invention.

DETAILED DESCRIPTION

In the sole drawing FIGURE, there is shown a portion of a monolithic superconducting winding 10 which is protected against intolerable frictional heating by the present invention and a support structure 11 for the superconducting winding 10.

The monolithic superconducting winding 10 typically comprises a plurality of composite conductors 14 which are each provided with insulation 15 therearound. Each composite conductor 14 typically comprises a large number of twisted filaments of niobium-titanium or of niobium-tin embedded in a copper matrix. The superconducting winding 10 is typically provided with a plurality of sheets of woven glass cloth 17 separating adjacent pairs of composite conductors 14, and, additionally being disposed between composite conductors 14 and the external surfaces of the superconducting winding 10, such as the lower surface 18 of the superconducting winding 10. The superconducting winding 10 is typically epoxy-impregnated to form a structure which is substantially rigid throughout, whereby vibrations of portions of the winding 10 with the attendant heating therefrom is avoided. The superconducting winding 10 can thus be said to be a "monolithic" structure.

The superconducting winding 10 generates a rapidly varying magnetic field during operation. This magnetic field is impressed upon the support 11 by the winding 10. Accordingly, the support 11 with which the present invention is utilized comprises a material having a high electrical resistivity whereby eddy current heating therein is limited to a tolerable level. That is to say, such eddy current heating is not sufficient to heat the superconducting winding 10 above the critical temperature for superconductivity. An appropriate material for the support 11 comprises a fiberglass-epoxy composite or stainless steel.

The support 11 typically has a low thermal diffusivity where it comprises, for example, the materials mentioned above. This means that the support 11 usually is not effective for absorbing frictional heat generated from relative sliding motion between the superconducting winding 10 and the support 11. The support 11 is provided with a plurality of spaced apart cooling channels 20 in the upper surface 21 of the support 11. Helium is circulated through the helium cooling channels 20 by any suitable means, such as with pressure as known in the art.

In order to minimize frictional heating due to relative sliding motion between the superconducting winding 10 and the support 11, the present invention provides compliant sheet material, shown as strips 22a–22d. The upper surfaces of the compliant sheet material 22a–22d, as viewed in the drawing figure, are bonded to the lower surface 18 of the superconducting winding 10. This may be accomplished, for example, by adhesive bonding. The lower surfaces of the compliant sheet material 22a–22d are disposed in contact with the upper surface of high thermal conductivity sheet metal, illustrated as strips 24a–24c.

The compliant sheet material 22a–22d has a low shear modulus whereby it can accommodate relative movement between the superconducting winding 10 and the support 11 while the upper and lower surfaces of the sheet material 22a–22d remain in fixed relation with the lower surface 18 of the winding 10 and the upper surface of the high thermal conductivity sheet metal 24a–24c, respectively. Preferred materials for the compliant sheet material 22a–22d comprise leather, cellulose paper, and polyethylene paper. A common feature of these materials is that they are porous. The porosity of the materials contributes to their low shear modulus and, additionally, to their ability to deform without significant generation of heat. A preferred thickness for the compliant sheet material 22a–22d is between about 0.010 and 0.100 centimeters.

The lower surface of the compliant sheet material 22a–22d is not bonded to the upper surface of the high thermal conductivity sheet metal 24a–24c for the following reason. Notwithstanding the ability of the compliant sheet material 22a–22d to accommodate "usual" degrees of relative motion between the superconducting winding 10 and the support 11, relative motion between the winding 10 and the support 11 may be so extensive, especially in localized areas, that it is desirable to have the lower surface of the compliant sheet material 22a–22d able to slide relative to the upper surface of the high thermal conductivity sheet metal 24a–24c. In order to minimize any relative sliding between the foregoing surfaces, however, the support 11 is held against the superconducting winding 10 by a compressional force as indicated diagrammatically at 25. This compressional force is preferably between about 5,000 and 10,000 psi. This compressional force is preferably applied by a shrunk-on cylindrical housing (not shown) which contains a plurality of superconducting windings, with the support structure for these windings surrounding the windings. A frictional force which is produced between the compliant sheet material 22a–22d and the high thermal conductivity metal 22a–22c is thus proportional to this compressional force.

In order to harmlessly dissipate frictional heat generated by relative sliding motion which can occur between the compliant sheet material 22a–22d and the sheet metal 24a–24c, the sheet metal 24a–24c serves to provide paths of high thermal conductance from the interface between the compliant sheet material 22a–22d and the sheet metal 24a–24c to the plurality of helium cooling channels 20. The sheet metal 24a–24c must have a thermal conductance which is approximately two orders of magnitude higher than the combined thermal conductance of the compliant sheet material 22 and the insulation of the superconducting winding 10 between the lower surface 18 thereof and the most proximate superconductors thereof. Therefore, since the heat flow from the location of the friction heating between the compliant sheet material 22 and the high thermal conductivity sheet metal 24a–24c to the surrounding material is proportional to the thermal conductance of the heat flow paths provided by the surrounding materials, only 1 to 2% of such frictional heat would reach the superconductors.

In order for the high thermal conductivity sheet metal 24a–24c to attain the foregoing degree of thermal conductivity it must comprise a metal with a thermal conductivity under a magnetic field subsisting during operation of the superconducting winding of between about 5 and 20 watts per centimeter per degree Kelvin. Suitable metals comprise high purity metals such as copper, aluminum or silver. A preferable purity for copper is 99.999% ("five" nines purity). A preferred purity for aluminum is approximately 99.9999% (six-nines purity). A preferred thickness for the sheet metal 24a–24c is between about 0.010 and 0.100 centimeters.

The high thermal conductivity sheet metal 24a–24c is illustrated as individual strips 24a, 24b, and 24c. The provision of the sheet metal 24a–24c in such strips is designed to limit eddy current heating of the sheet metal 24a–24c due to a rapidly varying magnetic field which the superconducting winding 10 may impress upon the sheet metal 24a–24c. The thickness and widths of each of the strips of sheet metal 24a–24c is selected, for a given high purity metal, to provide a thermal resistance from mid-way between adjacent helium cooling channels 20 to either of the cooling channels 20 of about 5° Kelvin centimeter per watt. By way of example, where the helium cooling channels 20 have depths of approximately 0.10 centimeters and widths of approximately 0.50 centimeters, with adjacent cooling channels 20 being spaced approximately 1.50 centimeters apart, sheet metal 24a-24c having the following characteristics has been found to be suitable:

Composition of sheet metal 24a-24c—99.999% pure copper
Thickness of sheet metal 24a-24c—0.013 centimeters
Width of a sheet metal strip 24a, 24b, or 24c—1.27 centimeters The high thermal conductivity sheet metal strips 24a-24c each have portions thereof respectfully disposed within the helium cooling channels 20. These portions advantageously each comprise a convoluted configuration for maximizing heat transfer from the sheet metal 24a-24c to the helium within the channels 20. The convoluted configuration illustrated is a V-shaped configuration, and is only one example of many possible configurations for maximizing heat transfer to the helium. The precise mechanism for transfer of heat from the sheet metal 24a-24c to the helium within the cooling channels 20 is not critical for the purposes of this invention. Suitable mechanisms for such heat transfer include convection of heat to the helium or "pool" boiling of helium due to heat supplied by the sheet metal 24a-24c.

It is desirable to have the high thermal conductivity sheet metal 24 bonded to the upper surface 21 of the support 11 to facilitate assembly of the invention. Accordingly, relative sliding motion between the sheet metal 24a-24c and the upper surface 21 of the support 11 is avoided. Without such bonding, frictional heat generated from relative sliding motion between the sheet metal 24a-24c and the upper surface 21 is readily dissipated in a harmless manner through the sheet metal 24 to the helium within the helium cooling ducts 20, in accordance with the present invention.

In a preferred embodiment of the present invention, all interfaces between the superconducting winding 10 and a support structure 11 are provided with compliant sheet material 22a-22d, high thermal conductivity sheet metal 24a-24c, and helium cooling channels 20 in accordance with the present invention.

While the invention has been described with respect to a specific embodiment, modifications thereof will occur to persons skilled in the art. All such modifications are deemed to fall within the true spirit and scope of the invention as defined in the appended claims.

What is claimed as my invention and desired to be secured by Letters Patent of the United States is:

1. Improved means to reduce heating of a monolithic superconducting winding due to friction generated at an interface between said superconducting winding and a support structure for said winding, said support structure comprising a material having a high electrical resistivity whereby eddy current heating therein is limited to a tolerable level, said support structure having a first surface held under a compressional force against said superconducting winding and having a plurality of spaced apart helium cooling channels in the first surface thereof, said improved means comprising:
   (a) compliant sheet material having a low shear modulus and having first and second sides, said first side being bonded to an external surface of said superconducting winding; and
   (b) high thermal conductivity sheet metal having first and second sides with said first side disposed in contact with said second side of said low shear modulus sheet material and said second side thereof disposed in contact with said first surface of said support structure, and having portions thereof respectively disposed within said plurality of said helium cooling channels.

2. The invention of claim 1 wherein said compliant sheet material comprises a porous sheet material.

3. The invention of claim 2 wherein said compliant sheet material is selected from the group consisting of leather, cellulose paper, and polyethylene paper.

4. The invention of claim 2 or 3 wherein said compliant sheet material has a thickness between about 0.010 and 0.100 centimeters.

5. The invention of claim 2 wherein said compliant sheet material comprises a plurality of pieces of compliant sheet material.

6. The invention of claim 1 or 3 wherein said high thermal conductivity sheet metal has a thermal conductivity under a magnetic field subsisting during operation of said superconducting winding of between about 5 and 20 watts per centimeter per degree Kelvin.

7. The invention of claim 6 wherein said high thermal conductivity sheet metal comprises one of the group consisting of approximately 99.999 percent purity copper and approximately 99.9999 percent purity aluminum.

8. The invention of claim 6 wherein said high thermal conductivity sheet metal has a thickness between about 0.010 and 0.100 centimeters.

9. The invention of claim 1 wherein a plurality of portions of said high thermal conductivity sheet metal which are disposed within said plurality of helium cooling channels each comprises a convoluted configuration.

10. The invention of claim 1 wherein said high thermal conductivity sheet metal comprises a plurality of strips of sheet metal.

11. The invention of claim 10 wherein said plurality of strips of sheet metal of said high thermal conductivity sheet metal each has portions which are respectively disposed within a plurality of said helium cooling channels.

12. The invention of claim 1 wherein said high thermal conductivity sheet metal is bonded to said first surface of said support structure.

13. The invention of claim 1 wherein said monolithic superconducting winding comprises an epoxy-impregnated superconducting winding.

14. The invention of claim 13 wherein said monolithic superconducting winding comprises insulation layers of woven glass cloth.

15. The invention of claim 13 wherein said monolithic superconducting winding comprises twisted filaments selected from the group consisting of niobium-titanium and niobium-tin.

16. The invention of claim 1 wherein said support structure comprises one of the group consisting of a fiberglass-epoxy composite and stainless steel.

17. The invention of claim 1 wherein said compressional force holding said support structure against said superconducting winding is between about 5,000 and 10,000 pounds per square inch.

* * * * *